United States Patent [19]

Swenskowski et al.

[11] Patent Number: 5,161,644
[45] Date of Patent: Nov. 10, 1992

[54] LUBRICATION SYSTEM FOR TANDEM AXLE ASSEMBLY

[75] Inventors: Kevin M. Swenskowski, Detroit; Richard K. Szymanski, Kalamazoo, both of Mich.

[73] Assignee: A. E. Chrow, Cleveland, Ohio

[21] Appl. No.: 870,072

[22] Filed: Apr. 17, 1992

[51] Int. Cl.⁵ .................................. F01M 1/00
[52] U.S. Cl. ...................... 184/6.12; 184/11.1; 74/606 R; 180/339
[58] Field of Search .............. 74/467, 606 R; 184/6.12, 6.2, 11.1, 11.2, 11.3, 11.4, 13.1; 180/339, 24.09

[56] References Cited

U.S. PATENT DOCUMENTS

| | | | |
|---|---|---|---|
| 1,512,676 | 10/1924 | Cook | 184/13.1 |
| 1,741,501 | 12/1929 | Crawford | 184/13.1 |
| 3,618,711 | 11/1971 | Vollmer | 184/11.2 |
| 3,771,622 | 11/1973 | Hyakumura | 184/11 A |
| 4,050,534 | 9/1977 | Nelson et al. | 180/24.09 |
| 4,612,818 | 9/1986 | Hari et al. | 74/467 |
| 4,754,847 | 7/1988 | Glaze et al. | 184/612 |

*Primary Examiner*—Ira S. Lazarus
*Assistant Examiner*—Alan B. Cariaso
*Attorney, Agent, or Firm*—A. E. Chrow

[57] ABSTRACT

A system is provided for conveying fluid lubricant forwardly to lubricate a forward bearing support member (26) of a vehicular tandem axle assembly (100). The system includes a first open-sided trough (38) in to which the fluid lubricant is deposited by a differential gear assembly (14). Trough (38) is in fluid communication with a second open-sided trough (40) that slopes forwardly and downwardly to the center line of bearing member (26) and is effective to enable the fluid lubricant to flow towards and lubricate bearing member (26) while the vehicle is ascending an incline.

3 Claims, 2 Drawing Sheets

LUBRICATION SYSTEM FOR TANDEM AXLE ASSEMBLY

INTRODUCTION

This invention relates generally to a system for lubricating a forward bearing support member of an input shaft of a vehicular tandem axle assembly and more particularly to a system that can effectively convey fluid lubricant to the forward bearing support member of a vehicular tandem axle assembly while the vehicle is ascending an incline.

BACKGROUND OF THE INVENTION

Tandem axles have been employed on larger trucks for many years as a means of transferring torque from the engine drive shaft to successive or tandem axles on the truck.

Examples of such tandem axles can be found in U.S. Pat. Nos. 3,771,622; 4,754,847 and 4,050,534 the disclosures of which are incorporated herein by reference and the latter of which is assigned to the assignee of the present invention.

As might be expected, such tandem axles are complicated mechanisms involving numerous rotating components that require lubrication to lessen friction and wear between engaging components such as gears as well as supporting bearing members.

Heretofor, the source of fluid lubricant has been from a reservoir of the fluid contained in the chamber in which the ring gear is located that transforms torque to the axle.

It has been the practice in the past to either incorporate specialized pumping gears or to utilize the axle assembly gears such as the ring gear itself to perform the additional task of pumping fluid lubricant under pressure to lubricate forward components such as the differential gear assembly or power divider of the axle assembly hereinafter described or to deposit the lubricant such as by splashing into an open-ended trough in the axle assembly housing wall that is operative to convey the lubricant forwardly to lubricate the forward components of the tandem axle assembly. Examples of such troughs are disclosed in U.S. Pat. No. 3,371,622 previously referred to and in U.S. Pat. No. 4,612,818, the disclosure of which is incorporated herein by reference.

Although, in at least one instance, it has been known to convey fluid lubricant from the differential gear assembly to the forward bearing member rotationally supporting the input shaft in certain tandem axle assemblies manufactured by Rockwell International Corporation, such troughs have been positioned in a substantially horizontal orientation and also have not been disposed at a vertical location enabling delivery of the fluid lubricant directly to the center line of the forward bearing support member.

The present invention overcomes such short commings by providing an open-sided trough in the tandem axle housing wall that slopes downwardly from the differential gear assembly to the center line of the forward bearing support member as is thus able to deliver fluid lubricant to the forward bearing member when the vehicle is ascending an incline rather than flowing backwardly under gravity therefrom which is of particular importance when the vehicle is under heavy load.

SUMMARY OF THE INVENTION

Accordingly, it is an object of this invention to provide a system for conveying fluid lubricant to the input shaft forward bearing support member of a vehicular tandem axle assembly.

It is another object of this invention to provide a system for conveying fluid lubricant to the center line of the input shaft forward bearing support member of a vehicular tandem axle assembly.

It is still another object of this invention to provide a system that is effective to convey fluid lubricant to the input shaft forward bearing support member of a tandem axle assembly while the vehicle is ascending an incline.

DESCRIPTION OF SOME PREFERRED EMBODIMENTS

Figure 1:
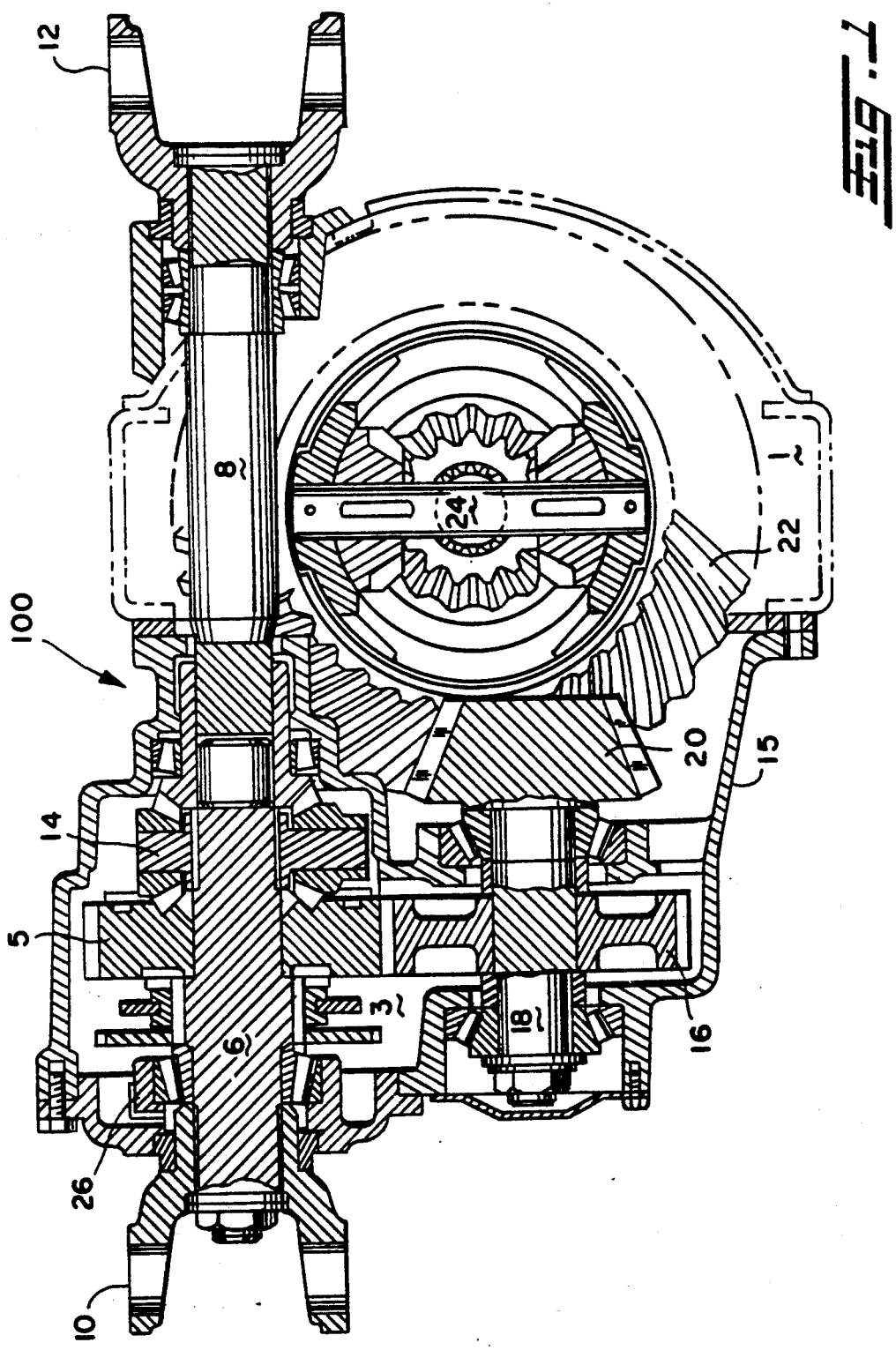
FIG. 1 is a central cross-sectional view of a vehicular tandem axle assembly 100 having the fluid lubrication conveyance system of the invention.

Tandem axle assembly 100 of FIG. 1 includes an input shaft 6 that is rotationally supported by forward support bearing member 26. Input shaft 6 has a universal joint connection 10 at its end that is used to secure input shaft 6 to the drive shaft (not shown) that is rotationally driven by the vehicle's engine.

An output shaft 8 is secured in substantial axial alignment to the opposite end of input shaft 6 and is journaled for simultaneous rotation therewith when input shaft 6 is rotated by the engine's drive shaft. Output shaft 8 has a universal connection 12 at its opposite end for connecting to an input shaft driving a subsequent or tandem axle of the vehicle.

A differential gear assembly or power divider generally referenced by numeral 14 is rotated by input shaft 6 and acts through differential gear 5 to drive transfer gear 16 which is secured to rotary pinion shaft 18. A pinion gear 20 is secured to an opposite end of pinion shaft 18 and has teeth that are meshingly engaged with the teeth of a rotary ring gear 22 that is operative to transfer torque to the vehicle's axle referenced by numeral 24. The operation of a tandem axle assembly such as referenced by numeral 100 is well known in the art and is thus not described here in greater detail.

Figure 2:
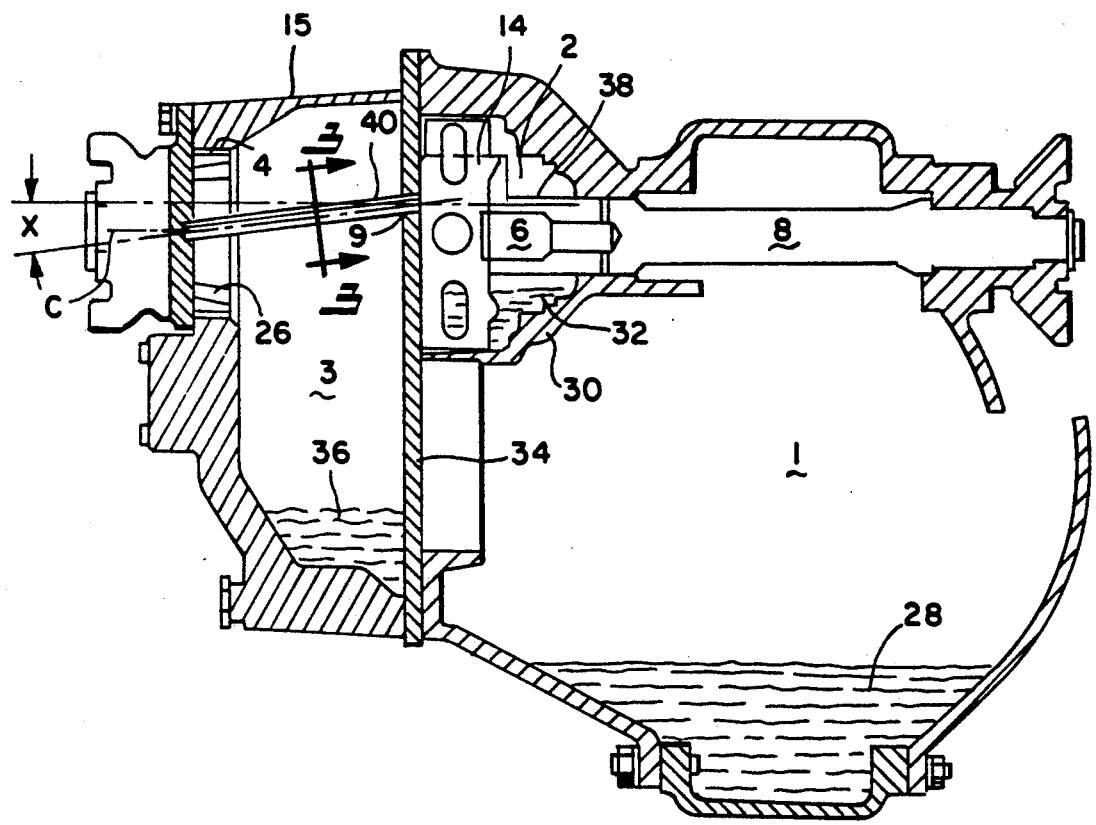
FIG. 2 is a central cross-sectional view of the housing of the tandem axle assembly of FIG. 1 with most of the internal components of the assembly removed.

Although a singular reference number 15 is used in the FIGURES to represent the housing wall that encloses the various components of tandem axle assembly 100, such wall includes the various sections and cover plates that are collectively secured together to create the entire housing which is shown in cross-section in FIG. 2 and generally referenced by numeral 15.

Housing wall 15 encloses a first chamber referenced by numeral 1 that contains ring gear 22 and a first reservoir 28 of fluid lubricant at its bottom that is used in lubricating assembly 100 and in which a lower portion of previously described ring gear 22 is emerged.

A second chamber 2 that contains all except at least a portion of differential gear 5 of differential gear assembly 14 is located within housing wall 15 forward of the center of chamber 1 and is separated therefrom by first portion wall 30. Chamber 2 has a second reservoir 32 of the fluid lubricant used in assembly 100 at the bottom thereof.

A third chamber 3 is located within housing wall 15 forward of chamber 2 and is separated therefrom by second portion wall 34. Chamber 3 contains differential gear 5. A third reservoir 36 of the fluid lubricant used in assembly 100 may be found at the bottom of chamber 3.

A fourth chamber referenced by numeral 4 is located within housing 15 forward of chamber 3. Chamber 4 is in fluid connection with chamber 3 and contains forward bearing member 26 that supports input shaft 6 for rotation.

Although, as previously described, it is known to utilize ring gear 22 to convey fluid lubricant from reservoir 28 of chamber 1 upwardly such as by splash and deposit the fluid in an open-sided trough in the axle assembly housing wall that is used to convey the fluid forwardly to the forward bearing support member, such trough or troughs have been heretofor horizontal and thus are ineffective in conveying the fluid lubricant forwardly when the vehicle is ascending a hill since gravity will pull the fluid lubricant backwardly and away from the forward bearing support member.

The heretofor described short commings of such horizontal prior art open-sided trough is overcome by disposing a first open-sided trough 38 in the housing wall that faces into chamber 2 and is oriented substantially parallel with input shaft 6 or otherwise is substantially horizontal when the vehicle having axle assembly 100 is itself in a horizontal position. Trough 38 extends forwardly across chamber 2 to opening 9 through second partition wall 34 which is in fluid connection with a second open-sided trough in the housing wall that has its open side facing into chamber 3 and extends forwardly and downwardly thereacross and into chamber 4 and ends at the center line of bearing support member 26 referenced by letter "c".

The downward slope angle of trough 40 represented by the letter "x" in FIG. 2 is predetermined to enable the fluid lubricant to flow by gravity forwardly to the center line of bearing support member 26 while the vehicle is ascending an incline having a slope for example of about 15° above horizontal resulting in angle "x" having a slope of about 15° below horizontal.

The fluid lubricant is conveyed from reservoir 32 upwardly by differential gear assembly 14 and deposited into trough 38 when ascending 14 is being rotated and may also be conveyed upwardly into trough 40 from reservoir 36 by transfer gear 16 and differential gear 5 to supplement the fluid deposited into trough 38 in the event fluid is present in reservoir 36.

In operation then, when the vehicle engine is running and the vehicle is moving, fluid lubricant contained in trough 38 moves forwardly through opening 9 and downwardly and forwardly along trough 40 to the center line of bearing support member 26 to effect its lubrication, particularly when the vehicle is ascending an incline.

Figure 3:
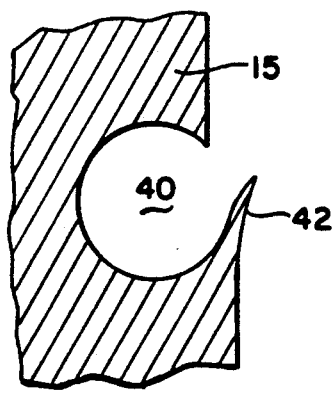
FIG. 3 is a cross-sectional view of a trough 40 in the housing wall of FIG. 2 taken along view line 3—3.

As illustrated in FIG. 3, the ability of open-sided trough 40 (and trough 38) to receive the fluid lubricant through the open side is enhanced by the trough including a lower lip 42 that extends into the chamber and enhances collection of the fluid lubricant into trough 40.

What is claimed is:

1. A system for delivering fluid lubricant to a forward bearing member rotationally supporting a rotary input shaft of a vehicular tandem axle assembly, said axle assembly comprising a housing enclosing;

a first chamber containing a rotary ring gear operably connected to the axle with a lower portion thereof immersed in a first reservoir of the fluid lubricant, a second chamber forward of the center of the first chamber and separated therefrom by a first partition wall, said second chamber containing a rotary differential assembly, said differential assembly rotatively driven by the input shaft and having a lower portion thereof immersed in a second reservoir of the fluid lubricant, a third chamber forward of the second chamber and separated therefrom by a second partition wall, said third chamber containing;

a transfer gear rotatively driven by a gear of the differential assembly extending through an opening through the second partition wall from the second chamber while the third chamber, said transfer gear secured to a rotary shaft having a pinion gear secured thereto that drivingly rotates the ring gear in response to rotation of the transfer gear, a fourth chamber forward of the third chamber, said fourth chamber in fluid communication with the third chamber and having the forward bearing member mounted therewithin; and said system comprising a first open-sided trough in a wall of said housing having an open-side thereof facing into the second chamber and extending forwardly thereacross in substantial parallel relationship to the input shaft and thence through an opening through the second partition wall in fluid connection with a second open-sided trough in the housing wall having an open side thereof facing into the third chamber and extending forwardly and downwardly thereacross and into the fourth chamber at a predetermined slope and ending in substantial alignment with the center of the forward bearing member, said first trough operative to collect fluid lubricant deposited therein upon conveyance thereto by the differential assembly from the second fluid lubricant reservoir, and said second trough slope effective to enable the fluid lubricant to flow by gravity theredown to lubricate the forward bearing whilst the vehicle is on an incline as well as collect fluid lubricant deposited thereto upon rotation of the transfer gear.

2. The system of claim 1 wherein the second trough downward slope is about 15 degrees below horizontal.

3. The system of claim 1 wherein at least the second trough includes a lower lip that extends into the third chamber and is operative to enhance the deposit of fluid lubricant into the second trough.

* * * * *